(12) United States Patent
Rauschert

(10) Patent No.: US 6,902,341 B1
(45) Date of Patent: Jun. 7, 2005

(54) TURNBUCKLE LINKAGE ASSEMBLY

(76) Inventor: Mark C. Rauschert, 590 E. Main St., Bushnell, IL (US) 61422

( * ) Notice: Subject to any disclaimer, the term of this patent is extended or adjusted under 35 U.S.C. 154(b) by 0 days.

(21) Appl. No.: 10/317,718

(22) Filed: Dec. 12, 2002

(51) Int. Cl.[7] ............................. F16B 7/06; G05G 1/00
(52) U.S. Cl. ......................... 403/43; 403/60; 403/78; 403/79; 403/301; 74/586
(58) Field of Search ............................ 403/43–48, 60, 403/78, 113, 164, 165, 300, 79; 74/579 R, 74/586, 593; 280/93.51

(56) References Cited

U.S. PATENT DOCUMENTS

| | | | |
|---|---|---|---|
| 1,395,871 A | * | 11/1921 | Randall et al. ............... 403/79 |
| 2,903,283 A | * | 9/1959 | Sweetland ................... 403/78 |
| 4,225,260 A | * | 9/1980 | Gaines |
| 5,529,316 A | * | 6/1996 | Mattila |
| 6,520,709 B1 | * | 2/2003 | Mosing et al. .............. 403/300 |

OTHER PUBLICATIONS

Midwest Control Products Corp. (Manufacturers of Ball Joints, Yoke Ends, Spherical Rod Ends, Wireforms and Tube Fabrications), Brochure for Wireforms Linkages Tubing, Jan., 2000, 68 pages.

* cited by examiner

Primary Examiner—Daniel P. Stodola
Assistant Examiner—Victor MacArthur

(57) ABSTRACT

A turnbuckle linkage assembly is provided for transmitting a force between first and second locations in a machine. The assembly includes a first link for connecting to the first location such as a rod, tube or cable, a second link for connecting to the second location, and a turnbuckle. A first, threaded connection connects the turnbuckle to the first link, and a second connection connects the turnbuckle to the second link. The second connection and the second link are arranged along an axis, and an interference fit at the second connection is formed by the turnbuckle and the second link permitting the turnbuckle to rotate relative to the second link but axially affixing the turnbuckle to the second link.

14 Claims, 8 Drawing Sheets

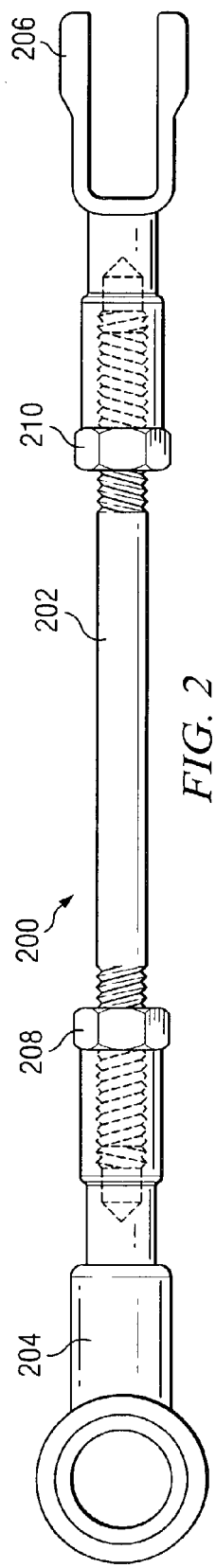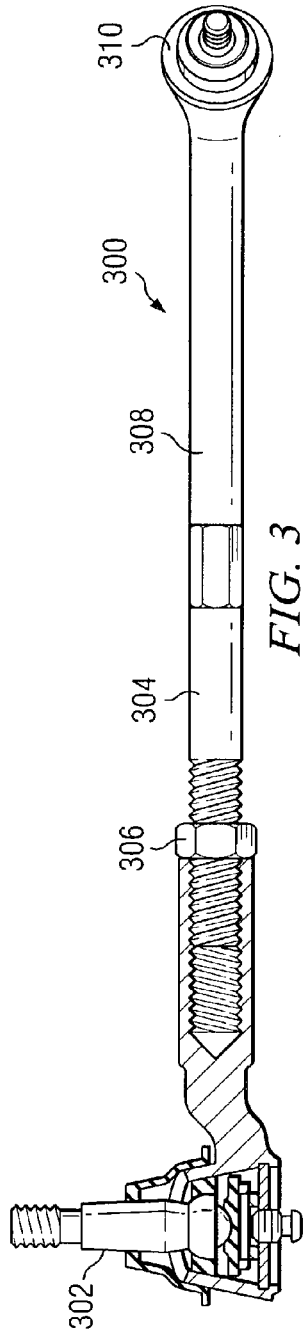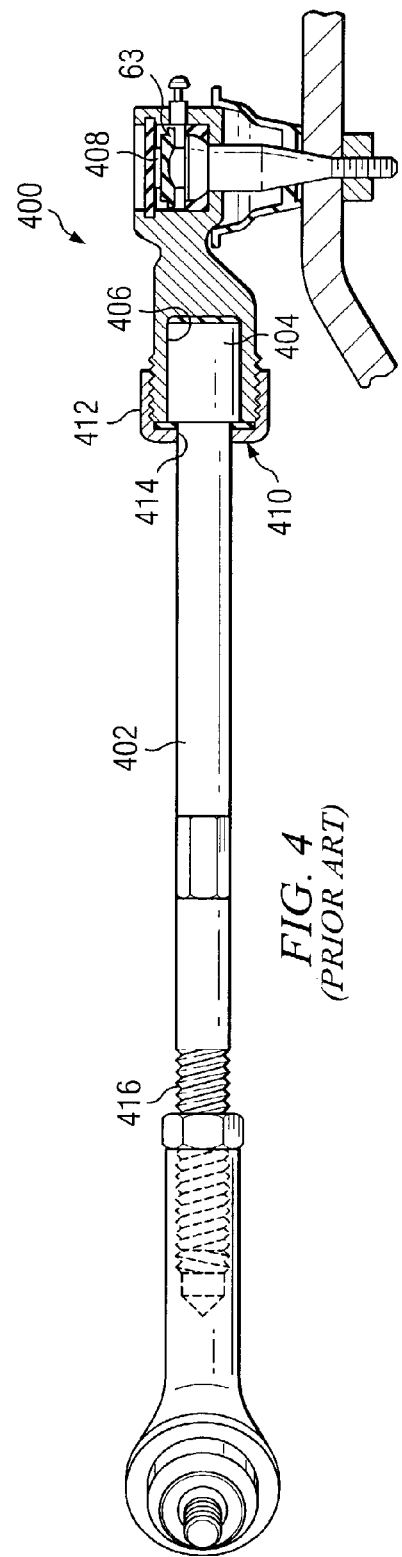
FIG. 2 (PRIOR ART)
FIG. 3 (PRIOR ART)
FIG. 4 (PRIOR ART)

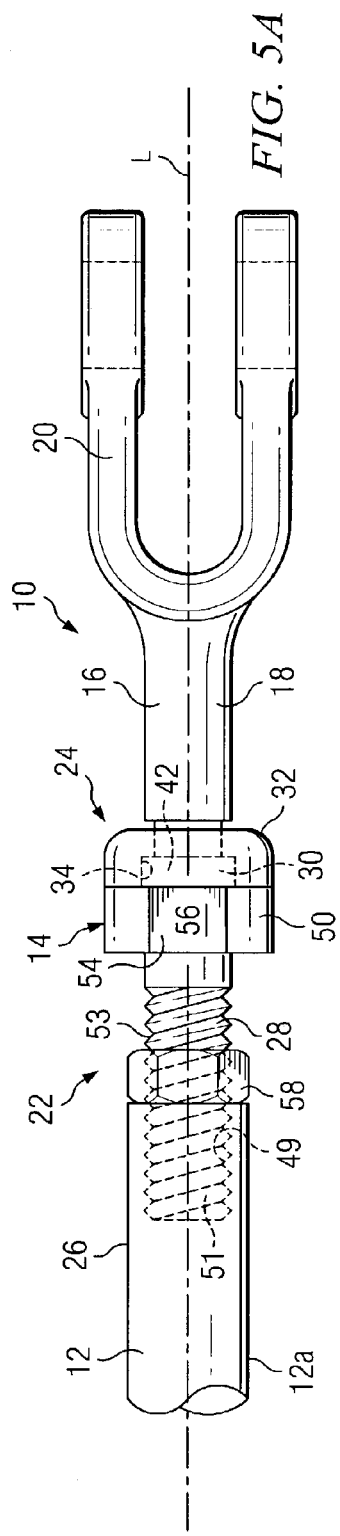
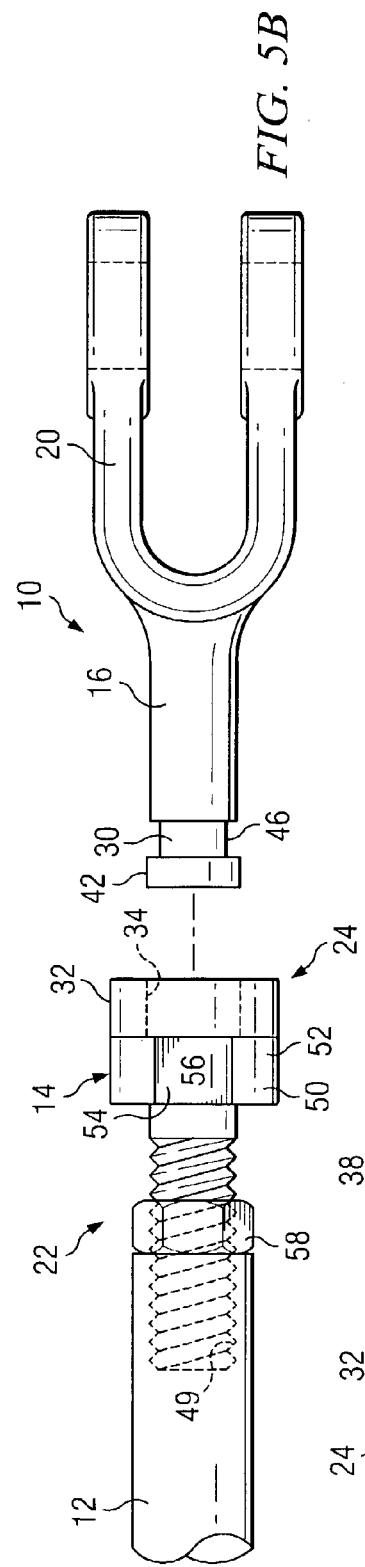
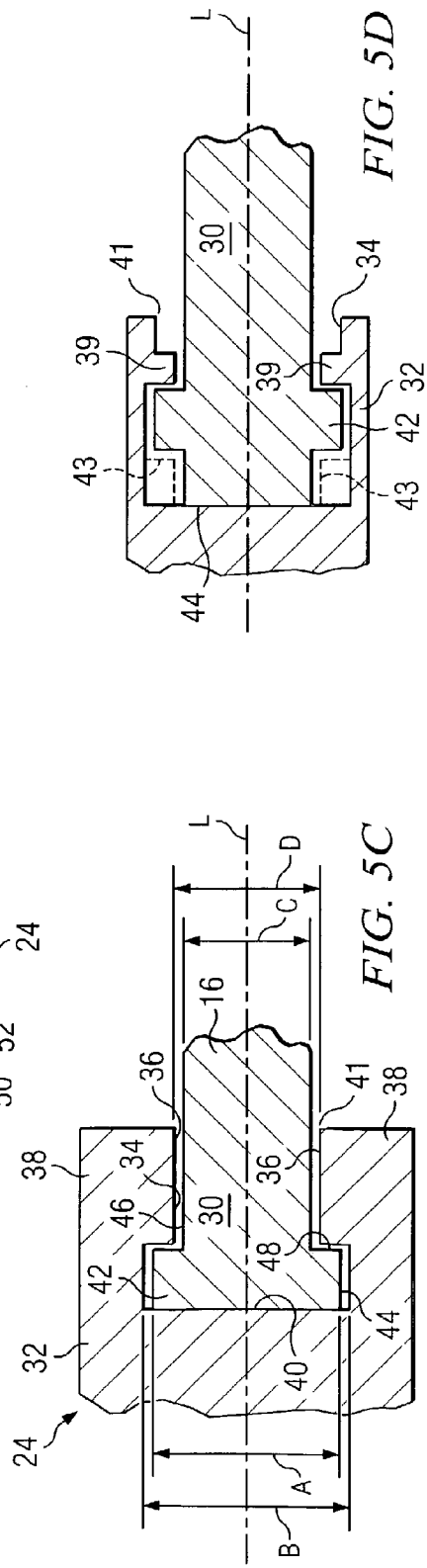

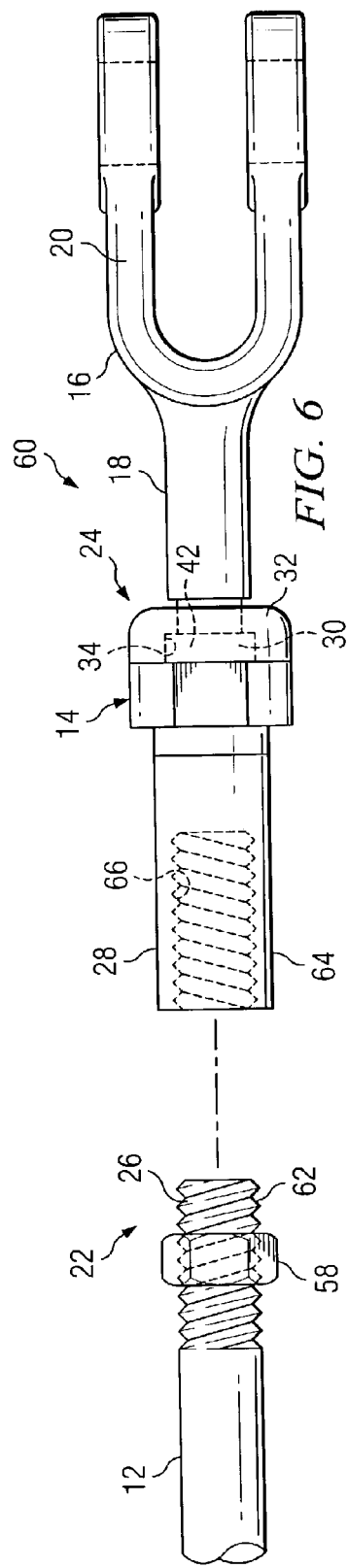
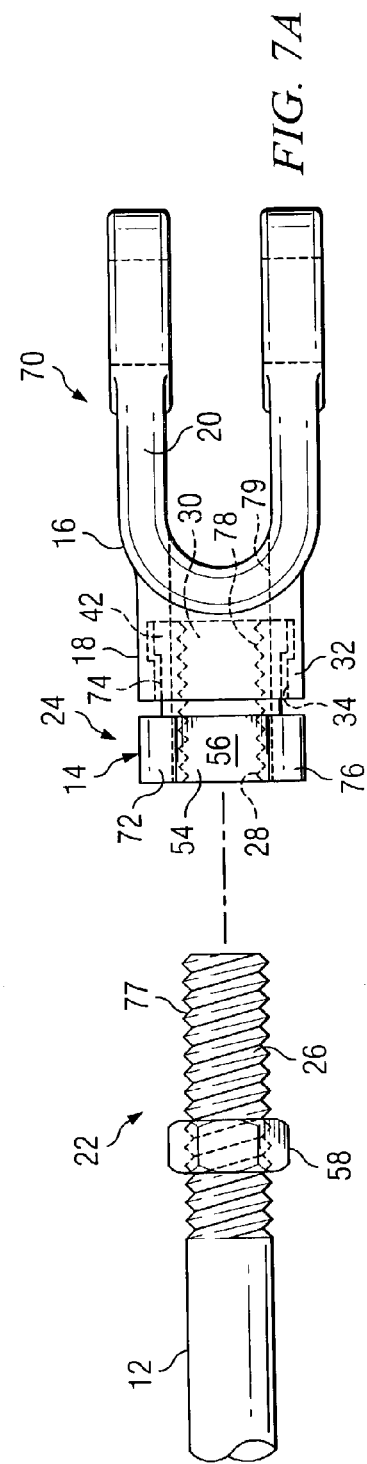
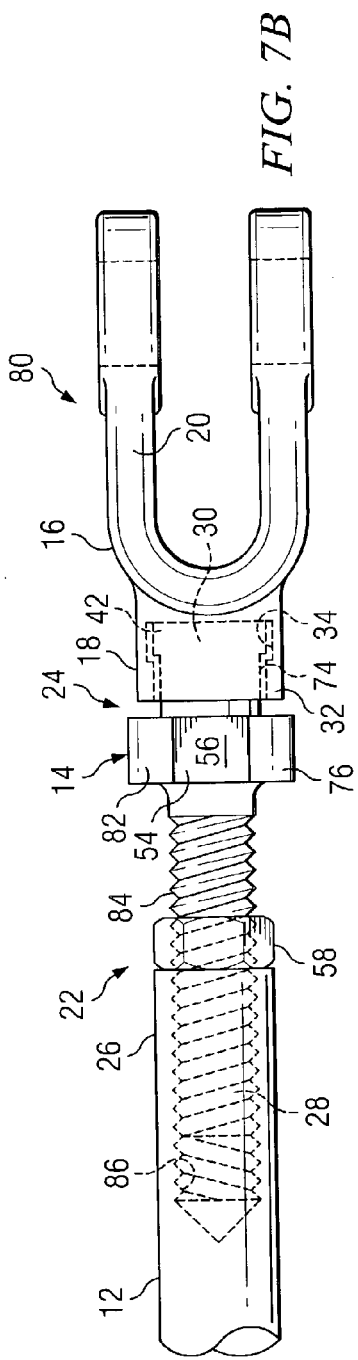

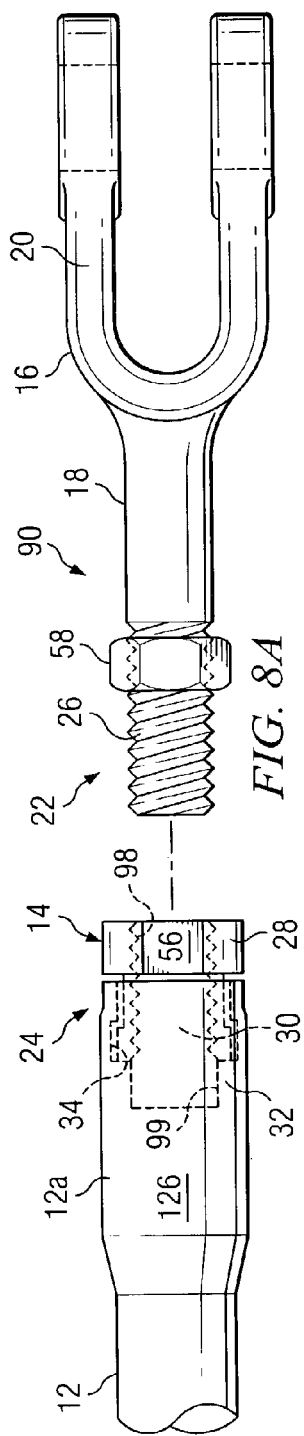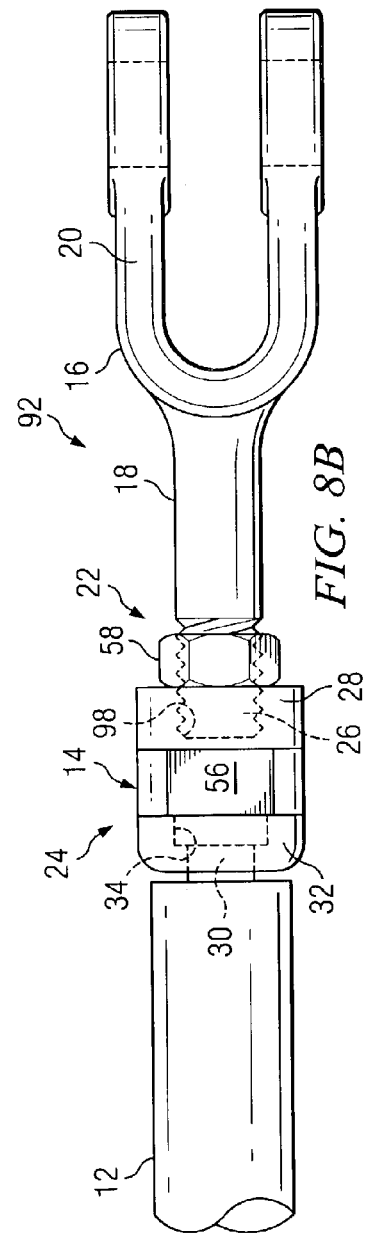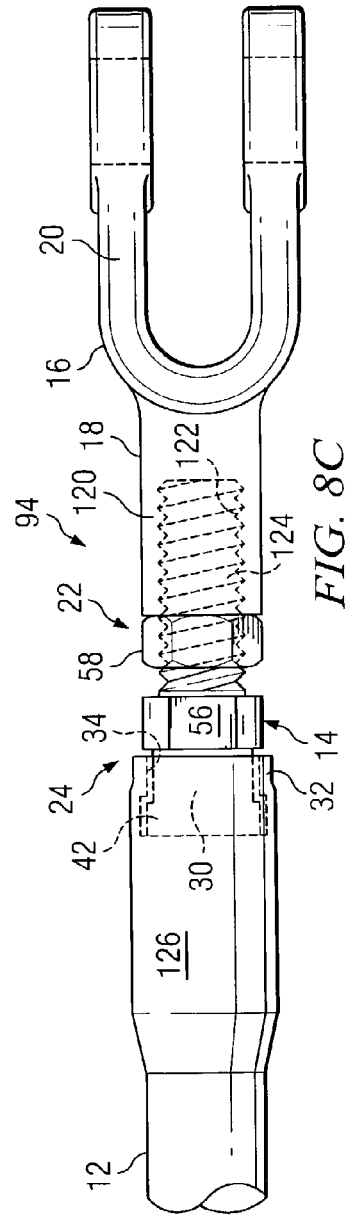

TURNBUCKLE LINKAGE ASSEMBLY

TECHNICAL FIELD

The invention relates generally to mechanical linkage assemblies such as control or tie rods or cables that transfer motion from one location in a machine to another location in the machine, and more particularly, to linkages where adjusting the total length of the linkage assembly requires rotation of a connector on the assembly.

BACKGROUND OF THE INVENTION

Many different machines and vehicles use either rigid linkage assemblies, such as control rods and tubes, or flexible linkage assemblies, such as push-pull control cables. Rigid linkages are typically used to attach manual shifters on vehicles (such as in automobiles, trucks or maintenance and construction vehicles) to the mechanism that is being shifted or moved (e.g. to gears, brakes, hydraulic valves, steering systems or control arms for moving scoops, hoes, plows, etc.). Other linkage assemblies are used on non-vehicular machines such as medical equipment and packing machinery.

The linkage assembly typically includes at least one rod or cable with one or two ends; each end is attached to a specific purpose end connector. These end connectors can have yokes (or clevises), ball joints, spherical rod ends, grooves, slots, hooks or any other shape or structure for attaching to further machinery. The rod or cable is typically threaded on its ends for attachment to the connector ends. The total length of the linkage assembly is set by threading a certain length of rod or cable into the end connectors.

These linkage assemblies must be a particular length between its ends in order to provide a specific amount of movement in a certain direction on one end of the assembly produced by moving the linkage assembly on its other end. If the linkage assembly is too long or too short, it may work inefficiently or badly, may not work at all, or it may require an uncomfortable or awkward amount of pressure or "feel" on linkage systems that are manipulated by hand or foot.

The conventional linkage assembly, however, must be assembled with the end connectors in order to determine if the correct length for the linkage assembly has been established. When the end connector is not free to rotate due to its attachment to the further machinery, the end connector must be de-installed from the machinery in order to adjust (thread or unthread) the length of the linkage assembly or a turnbuckle function is required. Traditional turnbuckle designs require a turnbuckle member as a separate component which is in turn attached directly to the linkage ends, or to a threaded rod or tube which is in turn connected to the linkage ends. Adjustment in this design can be provided but only by loosening at least two nuts and adjusting the turnbuckle component. FIG. 1 shows such a traditional design.

In addition, when the end connector must be in a certain orientation relative to the further machinery it is attaching to (e.g. a clevis connector end attaching to a pin held at a certain angle on the machine), the end connector can only be turned 180 or 360 degrees for threading on the control cable or rod for adjusting length. In other words, the end connector type in the case of the clevis or yoke that attaches to a pin limits the threading to a ½ or full turn. The end connector cannot be turned in increments between ½ and full turns. Similarly, ball joints with extension rods that must face a certain direction can only be turned one full turn.

Referring to FIG. 1, in some cases, these problems were solved with the common turnbuckle 100 which is a cylindrical bar 102 with interior threading (not shown) on both ends. A separate rod 104, 106 extends from each end of the bar 102 to provide a continuous linkage between end connectors 108, 102. Turning the bar 102 adjusts rods 104, 106 in or out of the bar 102 due to the threads, which changes the total length of the control device from the far ends of each rod. The jam nuts 110, 112 hold the position of the turnbuckle on each side, and must be loosened each time an assembly length change is desired.

The turnbuckle 102, however, must have one end with left hand threading while the other end has right hand threading. Thus, the adjustment requires three motions, the rotation of the turnbuckle and the rotation of the jam nuts on either end of the turnbuckle. At least two of these rotations are in opposite directions. This makes the adjustment procedure awkward and time consuming.

Referring to FIGS. 2–4, alternative solutions are presented by linkages 200, 300, and 400 disclosed by U.S. Pat. No. 5,529,316 issued to Mattila. Referring to FIG. 2, a linkage assembly 200 with a dual jam nut configuration is used where a single rod or cable 202 extends from one end connector 204 to another end connector 206. In this case, however, each end of the rod or cable 202 is threaded for adjustment with the respective end connector 204, 206. A jam nut 208, 210 is tightened against the end connectors respectively to hold the end connectors in place. In order to change the length of the linkage assembly, the jam nuts 208, 210 are loosened and the rod 202 is rotated until the desired length from end connector to end connector is established. The jam nuts are then retightened. This solution, however, is like the turnbuckle solution and requires opposite rotation of two jam nuts as well as rotation of the control rod 202.

Referring to FIG. 3, in yet another solution, a linkage assembly 300 has a single jam nut configuration with a single separate end connector 302 threaded to a rod 304 and fixed by a single jam nut 306. The opposite end 308 of the rod 304 has an integrally formed end connector 310. While this configuration eliminates the need to tighten two jam nuts, it requires that at least one of the end connectors 302, 310 be detached or de-installed from the machinery in order to have a free end to rotate for threading/unthreading to adjust the length of the assembly.

Referring to FIG. 4, a solution to the problems presented in the turnbuckle and duel and single jam nut configurations is presented by linkage assembly 400. This configuration includes a rod end 402 with a cylindrical head 404 that is axially fixed in an unthreaded bore 406 of an end connector 408. A threaded cover nut 410 traps the head 404 within the base, and the end connector 408 is threaded on its exterior for mating with a cylindrical portion 412 of the cover nut 410. An interior side of the cylindrical portion is threaded for this purpose. The cover nut 410 permits the rod 402 to rotate freely through an aperture 414 while preventing of the cylindrical head 404 from escaping the bore 406.

With this configuration, the length of the assembly 400 can only be adjusted on the opposite threaded end 416 relative to the bore end 402. This is disadvantageous because depending on the position of the linkage assembly 400 in a machine, it may be extremely difficult to adjust the length of the assembly on just one end where structure of the machine is in the way of adjustment tools.

In addition, this configuration also has the risk of the cover nut 410 loosening, which would then permit the rod 404 to move axially, changing the length of the linkage assembly 400.

SUMMARY OF THE INVENTION

In keeping with one aspect of the present invention, a turnbuckle linkage assembly is provided for transmitting a force between first and second locations in a machine. The assembly includes a first link for connecting to the first location, a second link for connecting to the second location, and a turnbuckle. A first, threaded connection connects the turnbuckle to the first link, and a second connection connects the turnbuckle to the second link. The second connection and the second link are arranged along an axis, and an interference fit is formed by the turnbuckle and the second link permitting the turnbuckle to rotate relative to the second link but substantially axially affixing the turnbuckle to the second link.

In another aspect of the invention, one of the first and second links is a control element while the other of the first and second links is an end connector that has a link portion for connecting to the turnbuckle and a machine portion for connecting to the machine. The first threaded connection defines a first end connecting to a second end, while the second connection defines a third end connecting to a fourth end. A bore is defined by the fourth end, and the third end is affixed in the bore. The interference fit is formed within the bore so as to permit rotation of the third end within the bore while preventing substantial axial translation of the third end.

In another aspect of the invention, the fourth end has at least one inner surface defining the bore, and the inner surface(s) has at least one interference portion integrally formed with, and extending from, the inner surface(s). The interference portion blocks substantial axial translation of the third end.

In yet another aspect of the present invention, in one configuration, the end of the control element is a threaded end, and is the first end. In this configuration, the link portion of the end connector forms the fourth end that defines the bore. The second end and the third end are formed by the turnbuckle, and the second end is a threaded end for engaging the first end.

In an alternative aspect of the invention, while the end of the control element is still a threaded end and is still the first end, the link portion of the end connector forms the third end, and the turnbuckle forms the second end and the fourth end with the bore.

In a further part of the present invention, the end of the control element defines the fourth end and the bore. Here, the link portion of the end connector has a threaded end as the first end, and the turnbuckle forms the second end and the third end, for engaging the first end and fourth end respectively.

In another part of the present invention, the end of the control element forms the third end, while the turnbuckle forms said fourth end.

The present invention is also directed to method of forming a linkage assembly that engages a turnbuckle element with the second link. The method includes the steps of placing a male or female extension of one of the elements in a bore defined by the other element. Then, an integrally formed interference portion is formed by at least one action from the group consisting of swaging, crimping and both of the element defining the bore for axially fixing the extension within the bore while permitting it to rotate.

BRIEF DESCRIPTION OF THE DRAWINGS

The above mentioned and other features of this invention and the manner of obtaining them will be apparent, and the invention itself will be best understood, by reference to the following description of illustrated embodiments of the invention in conjunction with the drawings, in which like characters identify like parts and in which:

FIG. 2 is a partial cross-sectional side view of another link assembly with separate end connector on both ends of a rod as known in the prior art;

FIG. 3 is a partial cross-sectional side view of another link assembly with a separate end connector only on one end of a rod as known in the prior art;

FIG. 4 is a partial cross-sectional side view of yet another link assembly as known in the prior art;

FIG. 5A is a top view of a linkage assembly in accordance with the present invention;

FIG. 5B is an exploded top view of the linkage assembly of FIG. 5A in a different stage of manufacture than that shown in FIG. 5A and in accordance with the present invention;

FIG. 5C is a close-up axial sectional view of a portion of a linkage assembly in accordance with the present invention;

FIG. 5D is a close-up axial sectional view of an alternative portion of a linkage assembly in accordance with the present invention;

FIG. 6 is a top view of an alternative linkage assembly in accordance with the present invention;

FIG. 7A is a partially exploded top view of another alternative linkage assembly in accordance with the present invention;

FIG. 7B is a top view of yet another alternative linkage assembly in accordance with the present invention;

FIG. 8A is a partially exploded top view of another alternative linkage assembly in accordance with the present invention;

FIG. 8B is a top view of another alternative linkage assembly in accordance with the present invention;

FIG. 8C is a top view of another alternative linkage assembly in accordance with the present invention;

DETAILED DESCRIPTION OF THE INVENTION

Figure 9:
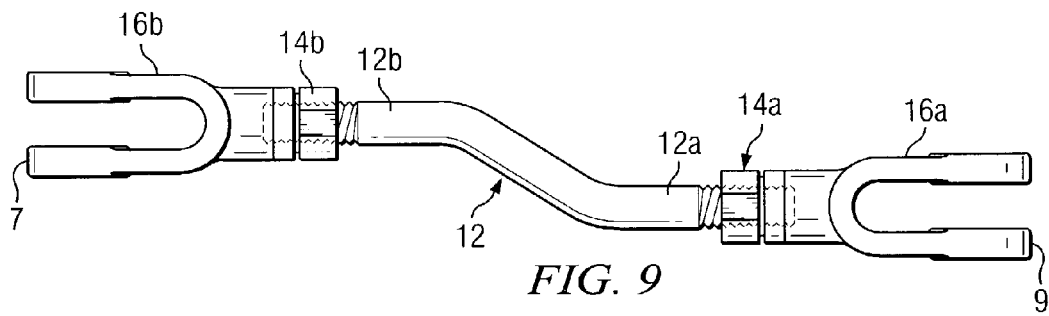
FIG. 9. is a side view of an alternative dual-ended linkage assembly where a turnbuckle and separate end connector are provided on both ends of the assembly in accordance to the present invention.

Referring to FIGS. 5A–B, a turnbuckle linkage assembly 10 has an elongated control element 12 with two ends 12a and 12b (as shown in FIG. 9) each threaded to a turnbuckle 14 (one shown in FIG. 5A). The control element 12 can be any structure such as an elongated solid rod, pipe, tube or push-pull cable. The turnbuckle 14 is rotatably attached to an end connector 16.

The end connector 16 has a link portion 18 for linking to the turnbuckle 14, and has a machine portion 20 for connecting to whatever machine it is a part of. The machine portion 20 is appropriately configured to impart a force with a particular strength and direction from the machine portion 20 to the link portion 18, or vice versa, and ultimately from one location 7 to another location 9 (shown on FIG. 9) in a machine. Thus, the machine portion 20 may have a clevis (or yoke), eye, ball joint, spherical rod end, or any other configuration to connect to mechanisms for manual shift levers, steering mechanisms, gears, brakes, machine arms on construction vehicles, moving parts on packing or medical machines, or any other machine or vehicle that requires the transfer of kinetic energy or motion from one location to another location in a machine.

The turnbuckle linkage assemblies of all of the embodiments include two connections: a first threaded connection 22 and a second or rotation connection 24. The threaded connection provides adjustable length (i.e. threading or unthreading determines a total length of the linkage assembly) between a first link and the turnbuckle 14 where the first link can either be the control element 12, end connector 16 or any other device or part of a machine with a threaded part. The second or rotation connection 24 (best seen in FIG. 5C) is between a second link and the turnbuckle 14 where the second link can also be the control element 12, end connector 16 or other device or part with an appropriate configuration as described below.

The rotation connection 24 ultimately permits the first link, or control element 12 in the case of FIG. 5A, to rotate freely relative to the second link, or end connector end (or vice versa) for FIG. 5A, so that (1) the end connector 16 does not need to be disassembled or de-installed from the machine in order to adjust the length of the linkage assembly, and (2) the end connector 16 can be positioned at any angle around the generally extending longitudinal axis L (shown on FIG. 5A) of the linkage assembly. In other words, the end connector 16, whether an eye, clevis, ball joint or spherical rod end, is not limited to ½ turn or one full turn adjustments.

The threaded connection 22 and the rotation connection 24 are located, respectively, between either of the links 12 and 16 and the turnbuckle 14. Thus, as shown in FIGS. 5A–B, 6, and 7A–B, the threaded connection 22 is located between the control element 12 and the turnbuckle 14, while the rotation connection 24 is located between the turnbuckle 14 and the end connector 16. In contrast, FIGS. 8A–D show alternatives where the threaded connection 22 is between the turnbuckle 14 and the end connector 16, while the rotation connection 24 is between the control element 12 and the turnbuckle 14.

Among the two links 12, 16 and the turnbuckle 14, for reference purposes, the two connections define four ends. The threaded connection 22 defines a first threaded end 26 that mates with a threaded second end 28. Either end 26, 28 can be the male or female end.

The rotation connection 24 defines a male third end 30 that is free to rotate within a bore 34 defined by a female fourth end 32, but is substantially axially affixed in the bore. The third end 38 is always the male end and the fourth end 32 is always the female end defining the bore 34. In each case, the two mating ends preferably come from two different mating links. For example, if the first end 26 is on the control element 12, then the second end 28 is on the turnbuckle 14; if the third end 30 is formed by the end connector 16, then the fourth end 32 is formed on the turnbuckle 14. This preferably applies to every configuration shown in FIGS. 5–15. Also in every embodiment, an interference fit between the third and fourth ends prevent them from being pulled apart, or axially displaced relative to each other in any substantial way.

Referring to FIG. 5C, generally speaking, an interference fit is formed at the second connection, and is formed by the turnbuckle 14 and the second link. More specifically, the interference fit is formed within the bore 34 so as to permit rotation of the male end 30 within the bore while preventing substantial axial motion or translation of the male end. To accomplish this, female end 32 has at least one inner surface 36 defining the bore 34 and a bottom 40 of the bore. The inner surface(s) 36 of the bore 34 has at least one integrally formed interference portion 38 extending radially into the bore 34 to form a smaller inner diameter D than the inner diameter B near the bottom 40 of the bore.

Referring to FIGS. 5C and 5D, the interference portion 38 may be an inwardly extending annulus about the longitudinal axis L, but may also be any portion of the fourth end 32 found to be adequate to hold the male end 30 in place axially. This includes an inward projection at a single point or two opposing points along the inner surface of the bore and about axis L.

The interference portion 38 in FIG. 5C is also shown to extend longitudinally all the way from a point within the bore to the opening 41 of the bore 34. Again, the interference portion 38 need only be long enough to hold the male end (or in the case of FIGS. 5A–5C a clevis end) 30 axially, and may more generally exist only at a single point or short length relative to the length or depth of the bore 34 that does not extend to opening 41, as shown for interference portion 39 in FIG. 5D for example.

In FIG. 5C, clevis 16 has a flange 42 preferably at its distal end 44. The flange 42 extends radially from an adjacent portion 46 of the clevis 16 so that it has a larger diameter than the adjacent portion 46.

The interference portion 38 extends into the bore 34 to trap the flange 42 between the interference portion 38 and the bottom 40 of the bore. The inner diameter D of the bore at the interference portion 38 should be smaller than the outer diameter A of the flange 42. When a force pulls the fourth or female end (or turnbuckle end in the case of FIGS. 5A–5C) 32 away from the clevis end 30, a top surface 48 of the flange 42 engages the interference portion 38 which blocks further substantial axial movement or translation of the clevis end 30 out of the bore 34.

Referring again to FIG. 5C, the inner diameter B of the bore 34 in the area of the flange 42 should be larger than the outer diameter A of the flange 42 in order to allow the clevis end 30 to rotate. Similarly, the outer diameter C of the adjacent portion 46 of the clevis end 30 should be slightly smaller than the inner diameter D of the bore 34 at the interference portion 38 so that the clevis end 30 remains free to rotate within the bore 34.

Referring to FIG. 5D, it will be appreciated that while in the preferred configuration the flange 42 is at the distal end 44 of the clevis end 30, the flange 42 can be anywhere along clevis end 30 as long as enough space is provided to trap the flange somewhere between an integrally formed turnbuckle interference portion 39 and the bottom 40 of the bore 34. When the flange 42 is not adjacent the bore bottom 40, the bore bottom may be flat as previously described or it also may be stepped as shown by lines 43 on FIG. 5D in dash to fit the clevis end 30.

Referring to FIGS. 5A and 5B, for linkage assembly 10, a female, internally threaded aperture 49 is formed by the end 12a of the control element 12. The turnbuckle 14 has an elongated male end 51 with external threads 53 that is received in aperture 49. Male clevis end 30 is received in non-threaded bore 34 of turnbuckle 14.

The turnbuckle 14 has a body 50 with a middle section 52 between the second end 28 and the turnbuckle end 32. The middle section 52 has two exterior surfaces 54 (only one shown) with two opposing flats 56 for receiving a tool (not shown) used to turn or hold the turnbuckle 14 to thread the control element 12 into or out of the turnbuckle.

A jam nut 58 is disposed on the threaded second end 28 on the turnbuckle 14 for tightening against the control element 12 to hold the position of the threaded connection 22.

In all of the remaining figures, features similar to those shown in FIGS. 5A–C or in more than one Figure are numbered similarly.

Referring to FIG. 6, a linkage assembly indicated 60 is similar to the configuration of linkage assembly 10 shown in FIGS. 5A–B except that the male and female threaded ends are reversed. Control element or rod 12 terminates in an externally threaded male end 62. Turnbuckle 14 has an elongated portion or extension 64 that defines a female internally threaded aperture 66 to engage control rod end 62.

Referring to FIG. 7A, turnbuckle 14 on linkage assembly 70 forms third (unthreaded male) end 30 which is received by bore 34 on end connector clevis 16. Turnbuckle 14 here has a body 72 with an end flange 42, a middle section 74 and female threaded section 76 that attaches to male threads 77 on the control element 12. The middle section 74 has a smaller diameter than the diameter of the flange 42.

The threaded section 76 also has at least two opposing flats 56 for receiving a tool used to either turn or hold the turnbuckle 14 to thread the control element 12 into or out of the turnbuckle 14. The body 72 is cylindrical and defines an internally threaded aperture 78 that is contiguous with a non-threaded aperture 79 in clevis 16.

While the aperture 79 is shown here to extend all the way through the end connector 16, there may not be any aperture 79 in the clevis 20 and the aperture may bottom out within link portion 18.

A jam nut 58 is disposed on the control element 12 and is tightened against the turnbuckle 14 to fix the threaded connection 22.

Referring to FIG. 7B, a linkage assembly 80 has a turnbuckle 14 with a body 82 that is similar to body 72 except that instead of being cylindrical and defining threaded aperture 78, the body 82 is preferably solid or cylindrical (to save material rather than for function) and the top (leftmost) section 76 has an externally threaded, elongated extension 84. In this case, the end 26 of control element or rod 12 defines a female threaded aperture 86 that threadedly receives the male threaded end 84 of the turnbuckle 14. Here, the jam nut 58 is disposed on the turnbuckle 14 and is tightened against the control rod.

Referring to FIGS. 8A–D, linkage assemblies 90, 92, 94 and 96 have the nonthreaded rotation connection 24 between the control rod 12 and the turnbuckle 14. The threaded connections 22 are between the turnbuckle 14 and the end connector or clevis 16.

Referring to FIGS. 8A–B, a male, externally threaded end 26 is provided on the link portion 18 of the clevis 16 of linkage assemblies 90 and 92. The turnbuckles 14 for assemblies 90 and 92 each have a threaded female aperture 98 for receiving the first ends 26. In FIG. 8A, where the threaded female aperture 98 is shown to extend all the way through the turnbuckle 14 and clevis 16, the aperture may be contiguous with a non-threaded aperture 99 extending in the end 12a of the control rod 12 in order to provide space for axial adjustment of the first end 26 into the control rod 12.

In FIG. 8B, the preferred configuration has the threaded aperture 98 bottoming out before reaching the vicinity of the nonthreaded connection 24 in order to maintain the freedom to rotate between the control rod 12 on one side and the turnbuckle 14 and clevis 16 on the other. It will be appreciated, however, that a non-threaded bore (not shown) could also extend through the third end 30 and control element 12 in FIG. 8B to provide axial space for adjusting the first end 26 of the end connector 16 as long as the non-threaded bore is wide enough to permit nonthreaded rotation of the first end 26 inside of it.

A jam nut 58 is also disposed on the first end 26 on each clevis 16 of assemblies 90 and 92 for tightening against the respective turnbuckles 14.

Figure 1:
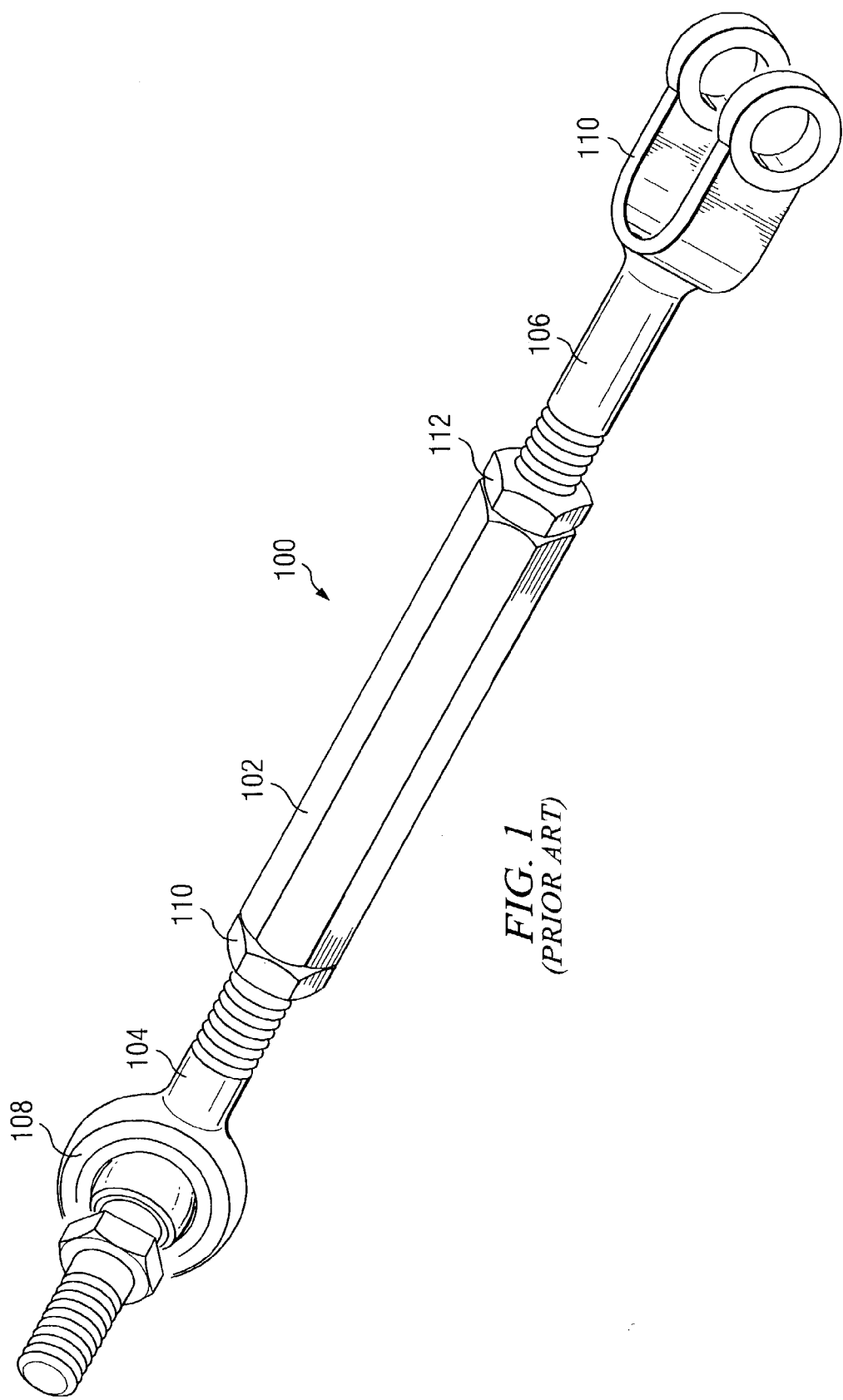
FIG. 1 is a perspective side view showing a turnbuckle link as known in the prior art.
Figure 8D:
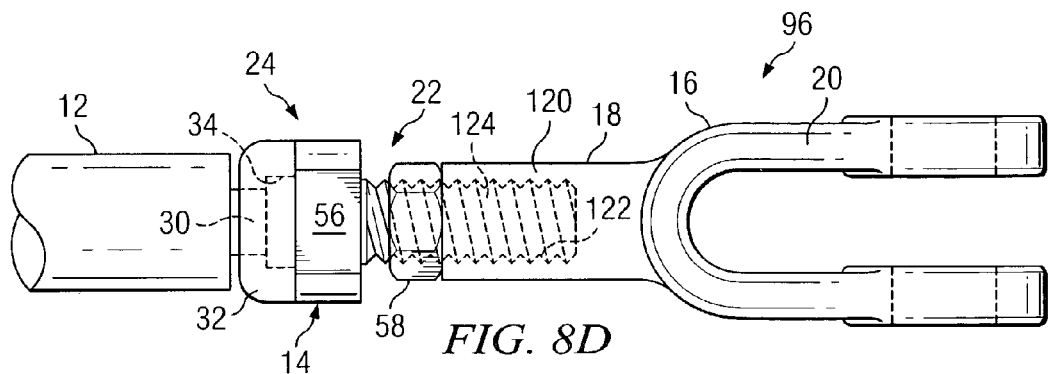
FIG. 8D is a top view of another alternative linkage assembly in accordance with the present invention.

Referring to FIGS. 8C–8D, in contrast to linkage assemblies 90, 92 shown in FIGS. 8A–8B, here each linkage assembly 94, 96 has a female extension 120 with an internally threaded aperture 122 on the link portion 18 of the clevis 16. A male, externally threaded extension 124 on turnbuckle 14 engages the aperture 122. Jam nut 58 is also provided on the extension 124 of the turnbuckle 14 for tightening against the connector end 16.

Referring to FIGS. 8A and 8C, regarding the nonthreaded rotation connection 24 between the second link and the turnbuckle 14, for linkage assemblies 90 and 94, the control rod 12 defines bore 34. The control rod 12 may or may not have a thickened portion 126 depending on the relative diameters of the links and turnbuckle and connection parts.

Since the linkage assembly 94 (FIG. 8C) has a turnbuckle 14 with a male threaded end 28 rather than a female threaded end 28, as with turnbuckle 14 of linkage assembly 90 (FIG. 8A), the turnbuckle 14 can be cylindrical or solid in this case.

Referring to FIGS. 8B and 8D, linkage assemblies 92 and 96 have the control element 16 providing the male non-threaded end 30 while the turnbuckle 14 has a female nonthreaded end 32 defining the bore 34.

In all four assemblies 90, 92, 94, 96, the flats 56 are provided for receiving a wrench as in the other embodiments of FIGS. 5–7.

Referring to FIG. 9, first end 12a control rod 12 is attached to a first end connector (here, a clevis)16a and first turnbuckle 14a. A second end 12b of the control element 12 is connected to a second turnbuckle 14b and a second end connector 16b, also a clevis in the illustrated embodiment. While the end connectors 16a, 16b are shown with yoke or clevis machine portions, any type of end connector can be used on either end whether of the same type or different types. In addition, while the linkage assembly 70 of FIG. 7A is shown on each end 12a, 12b of the control element 12, it will be appreciated that any of the linkage assemblies of FIGS. 5–15 can be placed on either end of the control element 12. Here, control element 12 is a rigid member and may be linear or non-linear as shown.

Figure 10:
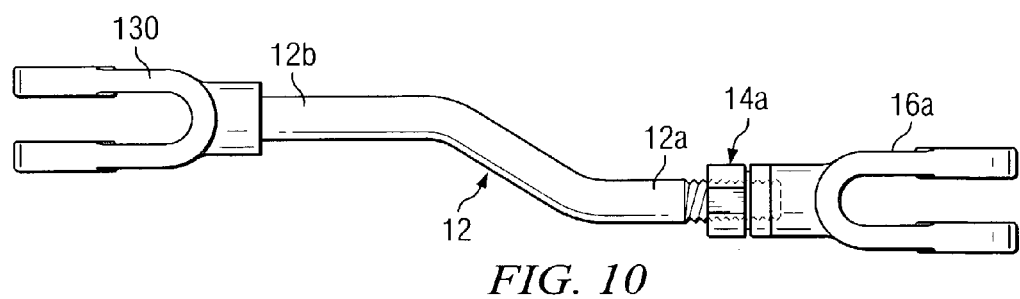
FIG. 10 is a side view of an alternative dual-ended linkage assembly where a turnbuckle and separate end connector are only provided on one end of the assembly in accordance to the present invention.

Referring to FIG. 10, the configuration is the same as in FIG. 9 except that the second end 12b of the control element has an integrally formed end connector end 130, and therefore does not need any turnbuckle on that end. The same variations in the configuration of the turnbuckle 14a and end connector types 16a and 16b in FIG. 9 also apply similarly to FIG. 10.

Figure 11:
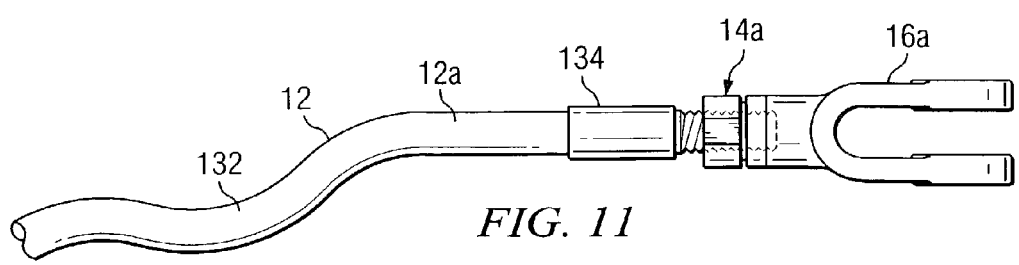
FIG. 11 is a side view showing a cable connection in accordance with the present invention.

FIG. 11 shows the same configuration as in FIG. 10 except with a non-rigid cable or tube 132 is the control element 12 rather than a rigid member as in FIG. 9. A rigid piece 134 is provided at the end of the cable 132 for connection to the turnbuckle 14a and end connector 16a.

Figure 12:
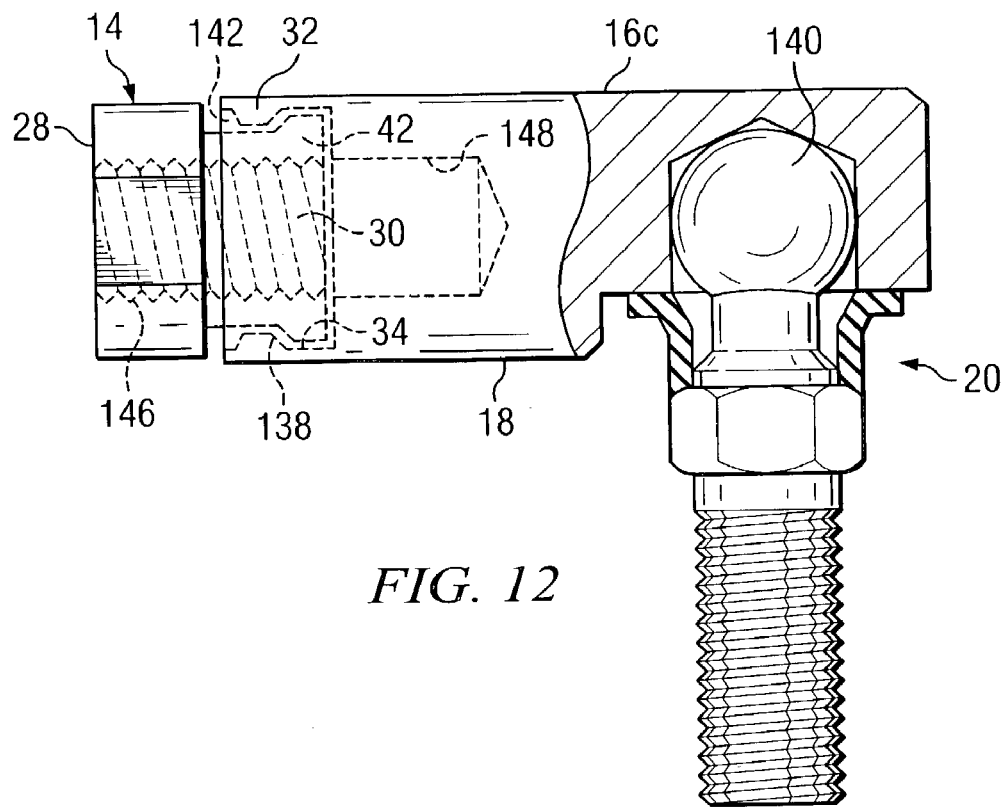
FIG. 12 is a side part sectional view of a linkage assembly with a connection to a rod end connector in accordance with the present invention.

Referring to FIGS. 12–15, some other possible end connector types are shown. Referring to FIG. 12, a spherical rod end connector 140 is shown with a turnbuckle 14. In this case, as shown similarly in FIG. 5D, an interference portion 138 of the unthreaded female turnbuckle end is positioned axially inwardly from an opening 142 of the bore 34. Here, as in FIG. 7A, the turnbuckle 14 has a female threaded aperture 146. The aperture 146 extends through male unthreaded end 30. A non-threaded aperture 148 is provided to be contiguous with threaded aperture 146.

Figure 13:
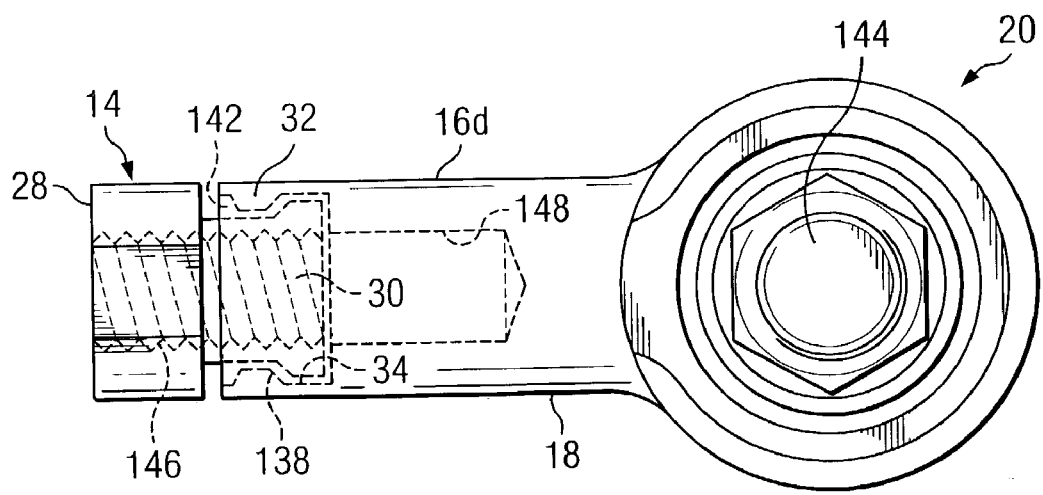
FIG. 13 is a side view of a linkage assembly showing a connection to a ball joint end connector in accordance with the present invention.

Referring to FIG. 13, an end connector 16d has the same features as end connector 16c in FIG. 12, except that here the machine portion 20 of the connector end 16d is a ball joint end connector 144.

Figure 14A:
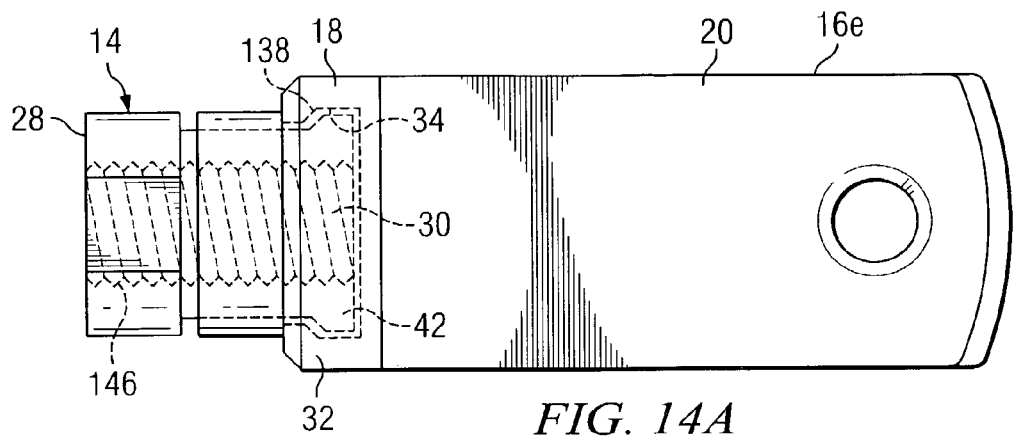
FIGS. 14A–B are side views taken orthogonally to each other of a linkage assembly showing a connection to a clevis end connector in accordance with the present invention.
Figure 14B:
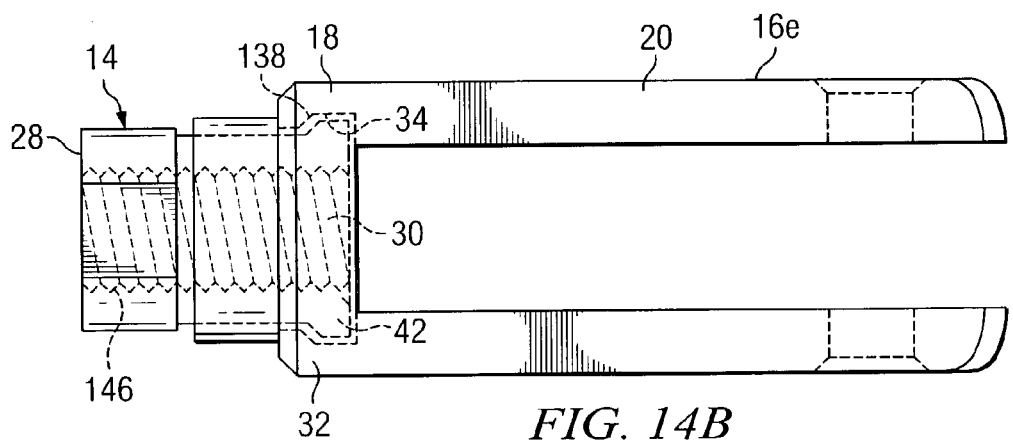

Referring to FIGS. 14A–B, the same turnbuckle 14 and the same link portion 18 is provided for clevis or yoke 16e as for end connector 16c in FIG. 12, except that the non-threaded aperture 148 is not provided.

Figure 15:
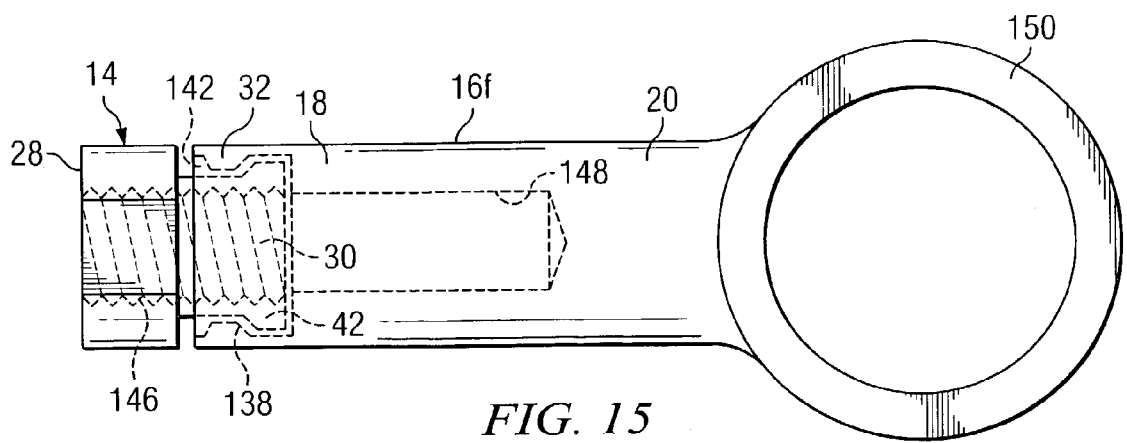
FIG. 15. is a side view of a linkage assembly showing a connection to a circular eye end connector in accordance with the present invention.

Referring to FIG. 15, an end connector 16f has the same structure as that of end connector 16c (FIG. 12) except that the machine portion 20 of the end connector 16f is an eye end connector 150.

It will be appreciated that any of the end connector types shown in FIGS. 12–15 as well as any other end connector type can be used with any of the linkage configurations of FIGS. 5–15.

Referring back to FIG. 5B, in order to form the non-threaded rotation connection 24, a male nonthreaded end 30 with flange 42 on one of the link elements 12, 16 or turnbuckle 14 is placed within the bore 34, which is defined by the inner surface(s) 36 of the female nonthreaded end 32 on whatever element 12, 14 or 16 that is being connected to.

Then, in an area known to be above the flange 42, an interference portion 38 is integrally formed in the inner surface 36 as shown in FIG. 5A and within the bore 34 for substantially axially fixing the extension within the bore. This also permits rotation of the extension within the bore and about axis L generally defined by the elements 12, 14 and 16.

The step of forming an interference portion 38 includes pressing or bending (i.e. moving) a section of the element defining the bore 34 so that the section extends into the bore. This is accomplished by swaging, crimping and/or both of the material forming a part of the bore 34. As shown in FIG. 5C, the entire top (here, rightward) portion is swaged/crimped to form interference portion 38, while in FIG. 5D interference portion 39 is formed by swaging/crimping only a small portion of the female nonthreaded end 32.

All three components, the end connector 16, turnbuckle 14, and control element 12 can be made of metals or plastics with appropriate strengths as known in the art.

The many advantages of this invention are now apparent. A first link is threaded to a turnbuckle 14 while a second link is connected to the turnbuckle 14 via a nonthreaded rotation connection 24. The nonthreaded rotation connection 24 axially fixes the second link to the turnbuckle while permitting it to rotate freely relative to the turnbuckle by providing an interference fit between the second link and the turnbuckle 14. This is formed by providing a male end 30 with a flange 42 on either the second link or the turnbuckle, and a bore 34 for receiving the male end on the other element. The interference fit is formed by an interference potion 38, 39 or 138 disposed within the bore 34 and that blocks the flange from moving axially within the bore.

While various embodiments of the present invention have been shown and described, it should be understood that other modifications, substitutions and alternatives can be made without departing from the spirit and scope of the invention, which should be determined from the appended claims.

What is claimed is:

1. A turnbuckle linkage assembly for transmitting a force between first and second locations in a machine, comprising:
   a unitary turnbuckle with a first end and a second end;
   an elongated control element with two opposite far ends, one said end being threadedly connected to said first end of said turnbuckle in an axially adjustable manner;
   an end connector having a unitary link portion for connecting to said second end of said turnbuckle and a machine portion integrally formed in a single piece with said link portion for connecting in the machine, said machine portion being in the shape of one selected from the group containing a clevis, yoke, eye, ball joint receptacle and spherical rod end receptacle; and
   an interference connection including a groove in the outer periphery of the second end of the turnbuckle permanently receiving a tip of the link portion of the end connector such that the turnbuckle cannot be separated from said end connector, the turnbuckle and end connector being arranged along an axis with an interference fit at said interference connection wherein the groove is larger than the tip such that the tip has longitudinal play within the groove permitting the turnbuckle to freely rotate and move longitudinally relative to the end connector but permanently affixing the turnbuckle within the end connector.

2. The linkage assembly of claim 1, wherein said interference connection includes one of said second end and said link portion having at least one inner surface defining a bore for receiving the other said second end or said fink portion, said inner surface(s) having at least one interference portion integrally formed with said inner surface(s) and extending from said inner surface(s) into said bore for blocking substantial axial translation of said second end or said link portion.

3. The linkage assembly according to claim 2, wherein said one of said end connector and said turnbuckle has another inner surface forming a bottom of said bore, and wherein said turnbuckle has a bottom flange, a middle section and a top section, said top section forming said first end and said middle section and said bottom flange together forming said second end, said middle section having a smaller outer diameter than an outer diameter of said bottom flange and said top section, and wherein said bore has at least an interference portion, a diameter of said bore at said interference portion being smaller than said outer diameter of said flange for trapping said bottom flange between said bottom of said bore and said interference portion of said bore, whereby said second end is substantially axially affixed within said bore while permitted to rotate.

4. The linkage assembly of claim 3, wherein said top section has an exterior surface with two opposing flats for receiving a tool used to hold said turnbuckle still while said control element is threaded into or out of said first turnbuckle.

5. The linkage assembly of claim 2, wherein said end connector is a first end connector, and said turnbuckle is a first turnbuckle, and wherein said control element has two threaded first ends for connecting to said first end connector on one end and a second end connector on the other end, said linkage assembly further comprising:
   a second end connector having a link portion defining a second bore; and
   a second turnbuckle with another second end rotatably free and substantially axially fixed in said second bore.

6. The linkage assembly of claim 5 further comprising two jam nuts disposed on said control element and tightened against said turnbuckles.

7. The linkage assembly of claim 2, wherein said interference portion is an annulus.

8. The linkage assembly of claim 1, wherein said control element is at least one from the group consisting of a solid rod, hollow rod, pipe, tube and cable.

9. The linkage assembly of claim 1, wherein said end connector is substantially shorter than said control element in a longitudinal direction generally defined by the assembly.

10. The linkage assembly of claim 1, wherein
    said link portion of said end connector forms a bore; and
    wherein said second end of said turnbuckle forms a male interference end received by said bore.

11. The linkage assembly of claim 1, further comprising a jam nut disposed on said control element and tightened against said turnbuckle.

12. The linkage assembly of claim 1, wherein said end on said control element is a threaded male end, and wherein said first end defines a threaded aperture on said turnbuckle for threadedly mating with said control element.

13. The linkage assembly of claim 1, wherein said end connector is a first end connector and said turnbuckle is a first turnbuckle, and wherein said control element has a second threaded end, and said linkage assembly further comprising a second turnbuckle connecting a second end connector to said second threaded end.

14. The linkage assembly of claim 1, wherein said end connector is a first end connector and said turnbuckle is a first turnbuckle, and wherein said control element has a second end integrally formed with a second end connector.

* * * * *